(12) United States Patent
Vetter et al.

(10) Patent No.: US 8,824,052 B2
(45) Date of Patent: Sep. 2, 2014

(54) APPARATUS FOR SHAPING THE LIGHT RAYS OF A LASER BEAM

(71) Applicant: Irepa Laser, Illkirch Graffenstaden (FR)

(72) Inventors: Peter-Alain Vetter, Altorf (FR); Eric Bernard, Strasbourg (FR); Thierry Engel, Strasbourg (FR)

(73) Assignee: Irepa Laser, Illkirch Graffenstaden (FR)

( * ) Notice: Subject to any disclaimer, the term of this patent is extended or adjusted under 35 U.S.C. 154(b) by 0 days.

(21) Appl. No.: 13/739,295

(22) Filed: Jan. 11, 2013

(65) Prior Publication Data

US 2013/0194673 A1  Aug. 1, 2013

(30) Foreign Application Priority Data

Jan. 11, 2012  (FR) .................................... 12 50286

(51) Int. Cl.
*G02B 27/10* (2006.01)

(52) U.S. Cl.
USPC ......................................... 359/618

(58) Field of Classification Search
USPC .......................................... 359/618
See application file for complete search history.

(56) References Cited

U.S. PATENT DOCUMENTS 6,554,464 B1 * 4/2003 Hawryluk et al. ............ 362/582
2005/0079645 A1   4/2005 Moriwaka

FOREIGN PATENT DOCUMENTS

JP   2006 251459 A   9/2006

OTHER PUBLICATIONS

French Search Report issued in corresponding application No. FR1250286 dated Sep. 20, 2012.

* cited by examiner

*Primary Examiner* — James Jones
(74) *Attorney, Agent, or Firm* — Carter, DeLuca, Farrell & Schmidt, LLP

(57) ABSTRACT

The present disclosure relates to a shaping device for light rays of a laser beam that cross it, wherein the shaping device is formed by a conduit including an entry orifice, an exit orifice, and an internal wall, achieved by one or a plurality of facets adapted to reorient by at least one reflection at least a part of the rays of the crossing beam.

13 Claims, 5 Drawing Sheets

— théorique
- - - expérimental

APPARATUS FOR SHAPING THE LIGHT RAYS OF A LASER BEAM

The present invention pertains to the field of systems for shaping laser beams and more particularly to the field of controlling energy distribution and laser-beam divergence.

At the present time, the laser has become a tool widely used in industry. For certain applications, it is necessary for the image of the light beam to have specific shape characteristics while exhibiting a homogeneous power distribution over the whole of the spot produced. For example, within the scope of a tempering laser, homogeneity is required in the energy distribution of the light beam. In addition, it may be necessary to have a beam whose depth of field is adapted to the applications, for example several dozen millimeters, in the case of thick workpieces.

Various optical devices currently exist that allow the rays of a laser beam to be processed to obtain specific optical, energy, and geometric characteristics. However, it should be noted that these devices have complex lens assemblies, which do not allow for simultaneously responding to the combined needs of the shaping, energy homogeneity, and depth of field.

The object of the present invention is to propose a simplified device that allows the rays of a laser beam to be shaped, with a view to obtaining a light beam with the optical characteristics of shape, energy distribution, and depth of field, in particular obtaining a light beam in which these characteristics are homogeneous and identical at various cross-sections along the length of the beam 9 emerging from the device.

This objective is achieved thanks to a device for shaping the light rays of a laser beam which it crosses, characterized in that the shaping device is formed by a conduit consisting of an entry orifice, an exit orifice, and an internal wall, achieved by one or a plurality of facets adapted to reorient by means of at least one reflection at least a part of the rays of the crossing beam.

Another objective of the invention is to propose, on the one hand, a shaping assembly for the light rays of a laser beam, characterized in that the assembly includes a device for shaping light rays according to the invention and, on the other hand, an optical system for concentrating the rays of the beam in the direction of the entry orifice of the shaping device.

Similarly, the invention concerns a system characterized in that it includes at least two assemblies for shaping light rays positioned side by side, the two assemblies performing the shaping of their respective light beams in an independent manner relative to one another.

Figure 1:
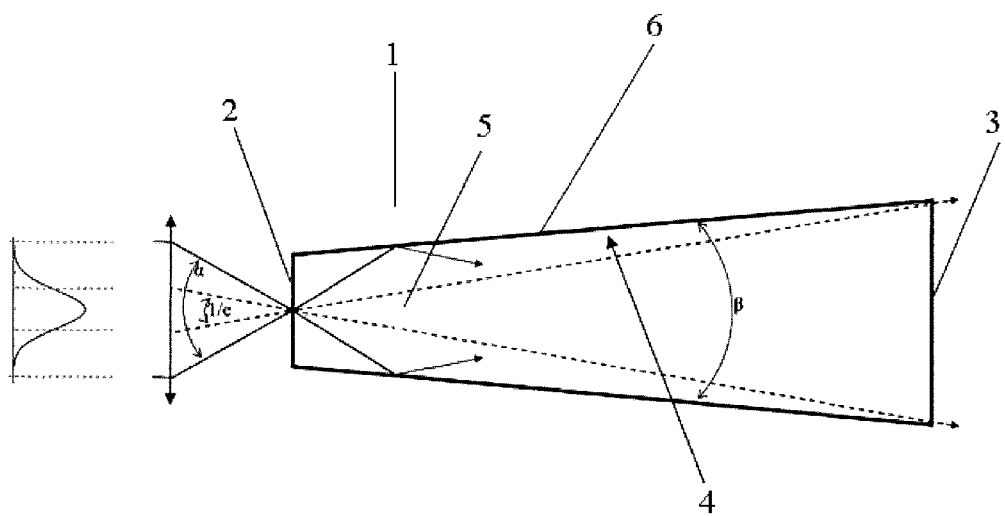
Figure 2:
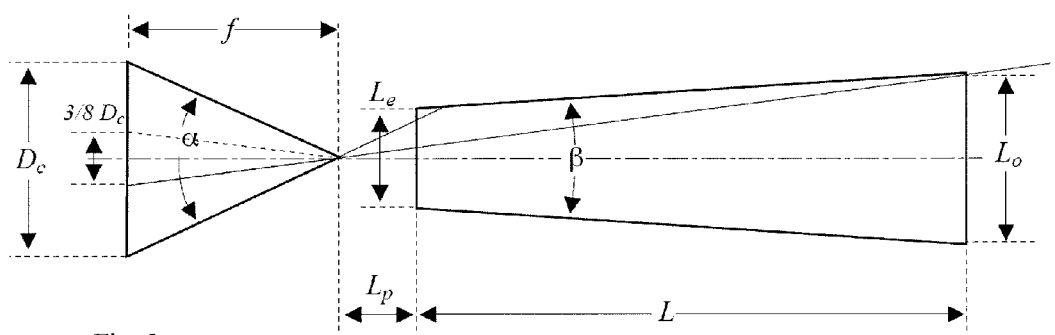
Figure 3:
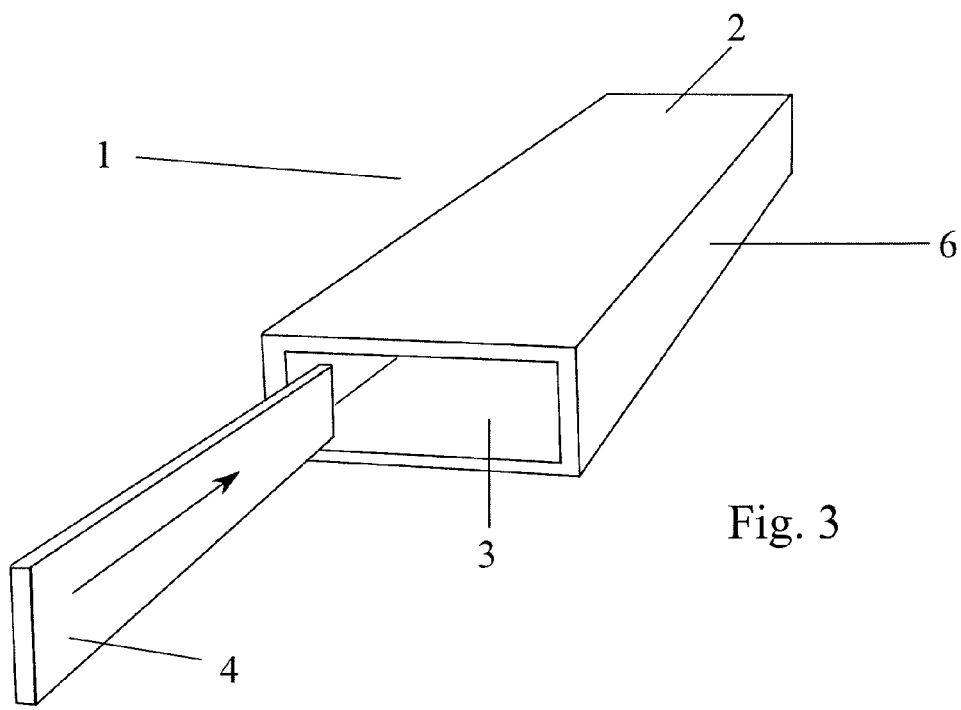
Figures 4A, 4B, 4C:
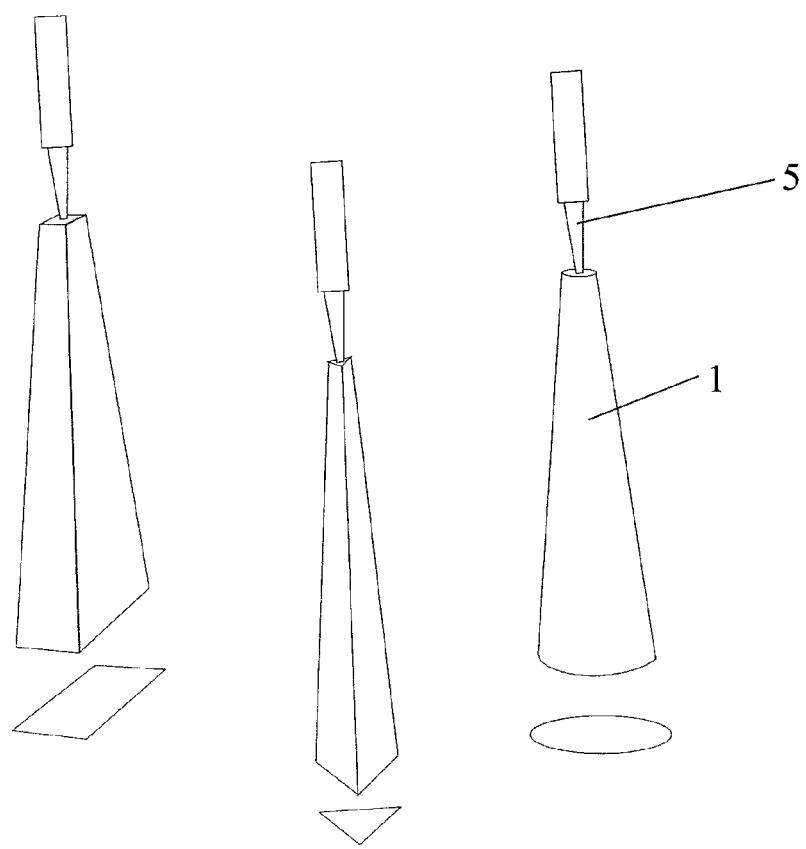
Figure 5:
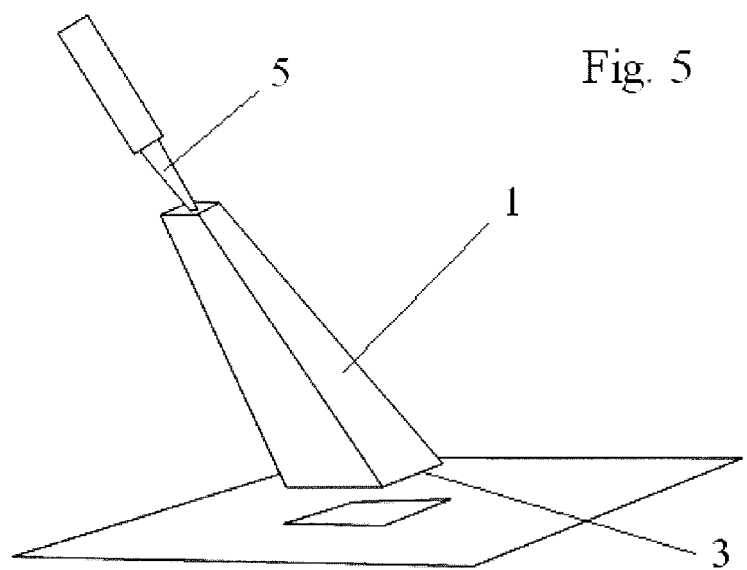
Figure 6:
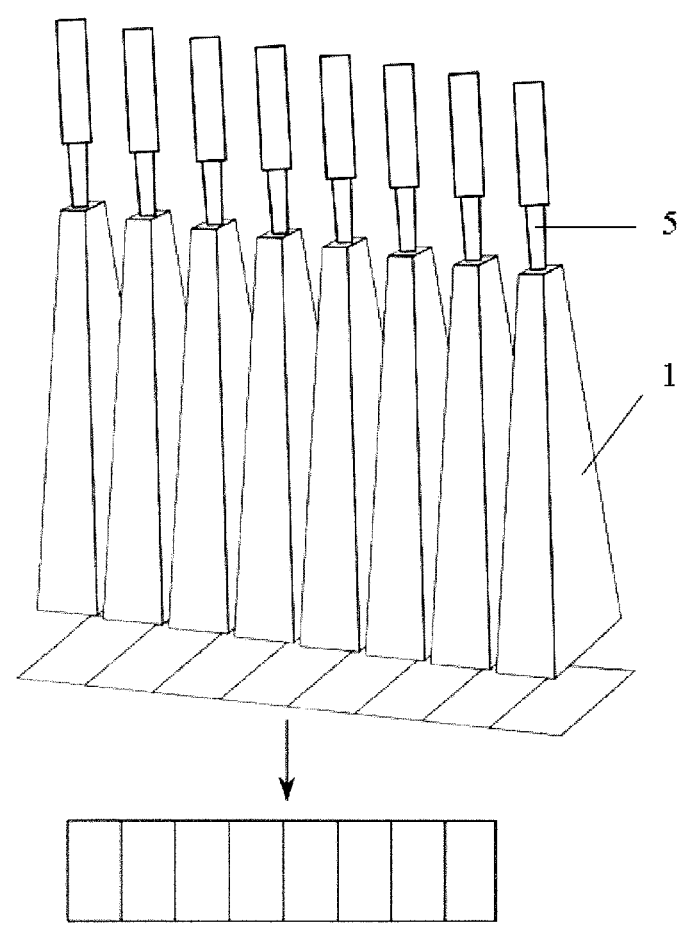
Figure 7:
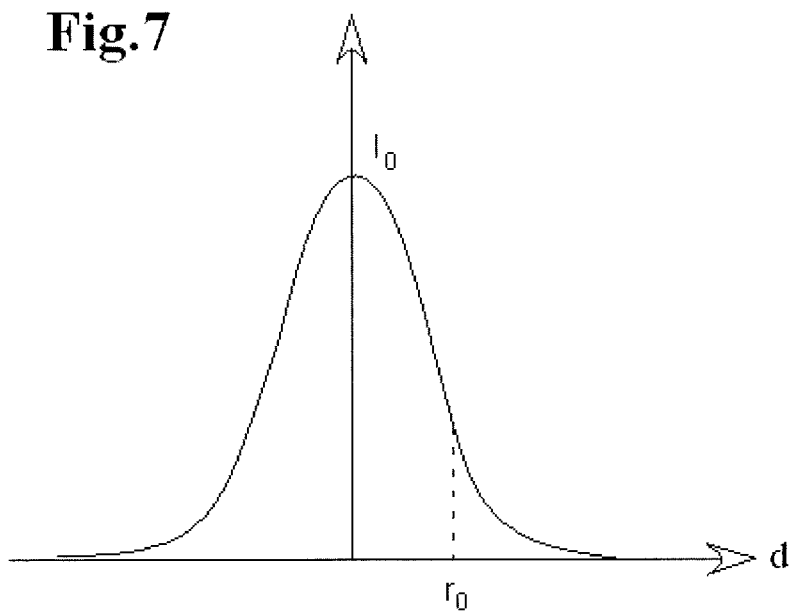
Figure 8:
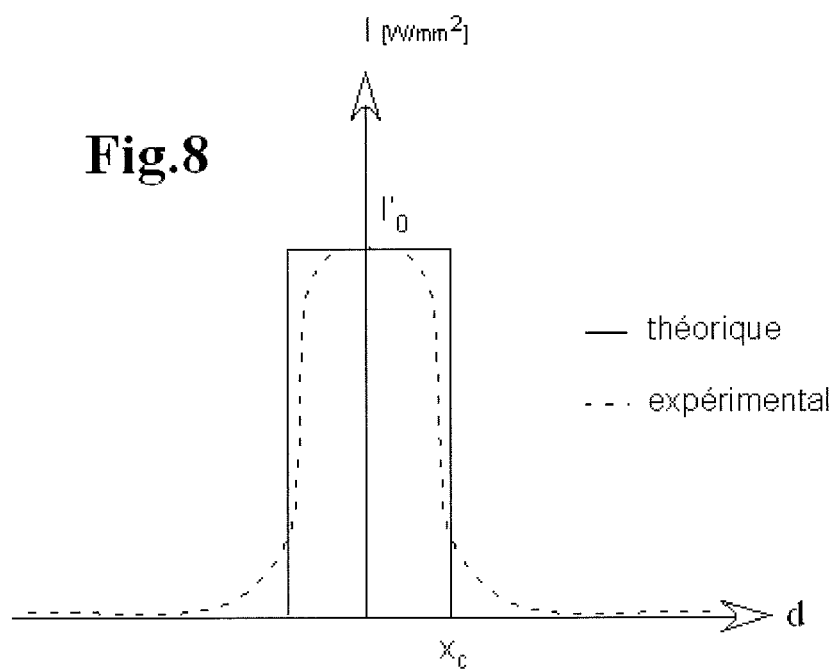
Figure 9:
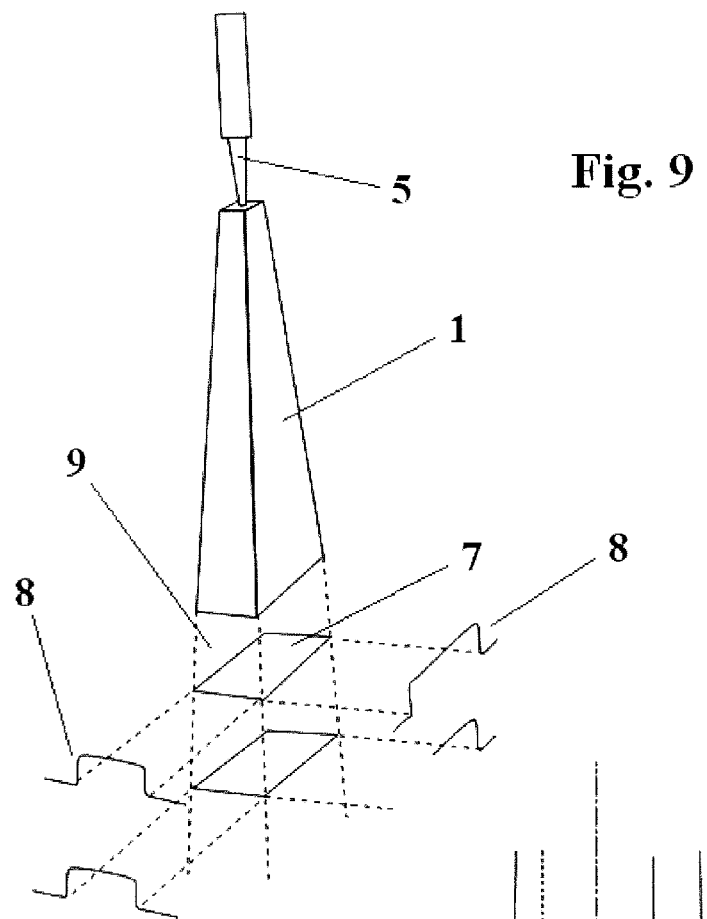
Figure 10:
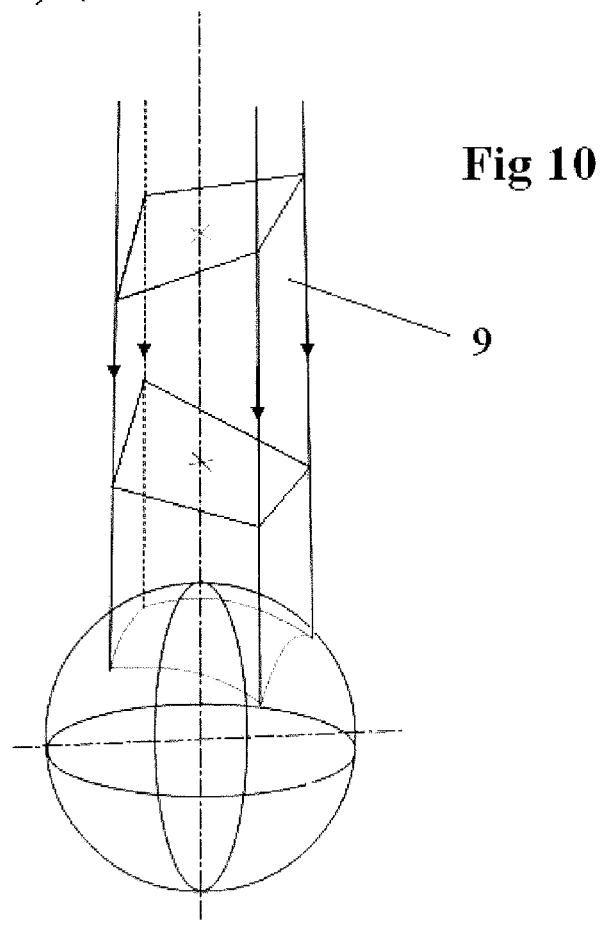

The invention will be better understood thanks to the following description, which relates to a preferred embodiment, given by way of a non-limiting example and explained with reference to the attached schematic drawings, in which:

FIG. 1 corresponds to examples of the reflection of different rays from the same laser beam in a shaping device of the invention, FIG. 2 presents some influential geometric parameters of the shaping device of the invention and of the incident laser beam, FIG. 3 presents an embodiment example of the internal wall of the shaping device of the invention, FIGS. 4a, 4b, and 4c present examples of shaping a laser beam by means of different configurations of a device according to the invention, FIG. 5 presents an embodiment example of a device according to the invention in operation including an exit orifice of a section truncated in a manner not perpendicular to the beam axis, the device including an axis that is not necessarily normal to the surface of the workpiece, FIG. 6 presents an example of a shaping system according to the invention, FIG. 7 represents an example of the distribution of the intensity of the radiation of a Gaussian laser beam incident upon a section of the beam, the abscissa defining the radial distance starting from the center of the beam where the intensity is a maximum, or $I_0$, FIG. 8 represents, on the one hand, by a continuous line, the distribution of the theoretical radiation intensity and, on the other hand, by a dashed line, the distribution of the radiation intensity obtained experimentally upon exiting the waveguide, after homogenization, FIG. 9 represents an example of slight divergence obtained in different sections of the beam as well as the intensity profiles obtained over these sections, FIG. 10 represents an example of non-perpendicular sections of the emergent beam, sections in which the intensity distribution obtained is quasi-constant.

The device of the invention is a device 1 for shaping the light rays of a laser beam that crosses it, characterized in that the shaping device is formed by a conduit including an entry orifice 2, an exit orifice 3, and an internal wall 4, achieved by one or a plurality of facets, adapted to reorient by means of at least one reflection at least a part of the rays of the crossing beam.

This device 1 shapes the light rays of the laser beam while allowing a reorientation by means of controlled reflection of at least a part of the rays of the beam that crosses the device 1. The laser beam thus reshaped then exhibits dimensional characteristics, a depth of field, and an energy distribution different from that of the laser beam that enters the device 1. The incident laser beam is preferentially of the Gaussian type, with a wavelength between the ultraviolet and the far infrared. In addition, this laser beam may be continuous or pulsed.

According to a non-limiting embodiment feature of the invention, the conduit preferentially exhibits a rectilinear axis that forms the projection direction of the laser beam when exiting the device 1.

The shaping device 1 operates by reflecting the peripheral part of the laser beam in such a way that the relationship between this part and a surface of a laser-beam section defines the desired optical, geometric, and energy properties of the laser beam upon exiting the shaping device 1. In order to end up with an exiting laser beam that exhibits well-defined shape, energy-distribution, and depth-of-field characteristics, the re-shaping of the incident laser beam has a combined arrangement of several of the geometric characteristics of the shaping device 1 and that is a function of at least one characteristic of the incident laser beam such as, for example, power, wavelength, beam diameter, focal length, etc. Thus, the geometric characteristics of the shaping device 1 taken into consideration can be selected from a list comprised of at least:

- the size Le and the aperture profile of the entry orifice 2 of the device 1,
- the size Lo and the aperture profile of the exit orifice 3 of the device 1,
- the shape of the exit orifice 3 of the device 1,
- the length L of the device 1,
- the position of the focal point of the laser beam 5 at the entry 2 of the device 1,
- the angle of focus a of laser beam 5 at the entry 2 of the device 1,
- the geometric structure or the shape of the conduit achieving a waveguide.

Although the geometric structure or shape of the conduit is explained in the following in this document, this conduit may be represented as a hollow tube with a variable cross-section, elliptical or rectangular, for example.

It should be noted however that, according to a preferred embodiment of the invention, on the one hand, the entry and exit dimensions, Le and Lo, of the device 1 are non-zero and that, on the other hand, the entry dimension Le is less than the exit dimension Lo of the device 1 such that the internal surfaces of device 1 are not parallel to one another and make an aperture angle β with one another.

The shaping device 1 of the invention is therefore defined, constructed, and adapted as a function of at least one characteristic of the laser beam 5 desired upon exiting the device 1 or at the point of interaction of the light beam with the surface of a specific structure (energy homogeneity of the beam, beam shape, etc.)

It should be noted that other parameters and characteristics of the shaping device 1 can be considered such as, in particular, the absorption and reflection properties of the material that the device 1 is made of, the surface state of the reflecting surfaces or the construction of those surfaces. As for the construction of the surfaces, this can be used for a more complex shaping of the beam, for example, when the construction is presented as an assembly of the multifaceted type.

The objective of the shaping device 1 for light rays is therefore to be positioned downstream of a laser source. According to a preferred, non-limiting embodiment of the invention, the rays of the laser beam 5 are concentrated in the shaping device 1 by a convergent lens. The laser beam 5 is then focused around the entry orifice 2 of the device 1. This focusing allows the device 1 to act upon at least a part of the rays of the laser beam and allows for shaping over the entire cross-section of the laser beam emitted. Combining the shaping device 1 for light rays with a convergent lens achieves a shaping assembly for the rays of beam 5.

According to a particular embodiment of the invention, the shaping device 1 of the invention is adapted to allow shaping of the beam 5 while executing a single and unique reflection, at most, with respect to a part of the incident laser-beam rays.

According to a preferred but non-limiting embodiment of the invention, the shaping device 1 of the invention is adapted to allow shaping of the beam 5 while executing, at most, a single and unique reflection with respect to each of the rays of the incident laser beam, this unique reflection being able to involve only a part of the rays of the incident laser beam. The length L of the device 1 is then defined in order for each of the rays of the incident laser beam, in combination with the aperture angle β, to be reflected only a single and unique time, at most.

This limitation in the number of reflections of the beam rays allows energy losses to be reduced during the spread of the beam rays and therefore to obtain a maximum energy output from shaping the laser beam 5.

The aperture angle β of the device 1 allows a directional homogeneity to be ensured and thus geometric homogeneity for the laser beam upon exiting the device. The limitation in the number of reflections for each of the rays that make up this exiting laser beam ensures energy homogeneity for this beam. Homogeneity is then obtained in different sections 7 of the beam as well as the intensity profiles 8 obtained over these sections 7 of the laser beam as illustrated in FIG. 9. Similarly, the three-dimensional geometric characteristics of this beam can be defined in specific ways in different sections of the laser beam's depth of field, sections over which an energy distribution is produced by choosing dimensions for the waveguide suited to the characteristics of the laser. The choice of waveguide dimensions is obtained by multiparameter optimization of the energy distribution obtained upon exit. Thus, in an application example, the laser beam 9 emerging into a volumetric space can be arranged to exhibit an energy density over a non-planar surface that allows for processing, for example, a rectangular surface of a spherical workpiece, as illustrated in FIG. 10.

According to a specific, non-limiting embodiment of the invention, the shaping device 1 is arranged to reorient that part of the rays of the incident laser beam 5 located on the periphery of the laser beam 5. According to a preferred embodiment, this reflected part of the rays of beam 5 can be defined in such a way that the energy relationship between the unreflected and the reflected parts of the beam, that is, the relationship between the central part of the beam, which is not reflected, and the overall section of the beam, limits the intensity variations obtained when exiting the waveguide.

A theoretical approach based on studying the intensity distribution upon exiting the waveguide allows optimal design conditions to be defined.

As a rule, the integral of the source beam intensity is calculated, which is compared to that of a homogeneous beam of characteristic dimension $x_c$. The calculation yields as a result a relationship $x_c/r_0 \approx 0.37$, in which:

$x_c$ is the characteristic dimension of the beam along a section corresponding to a flat intensity profile (ray or width, depending on the waveguide profile), $r_0$ is the ray defined at $I_0/e^2$, $I_0$ being the maximum intensity at the center of the incident beam.

Apart from this optimal value, the profile displays differences that, may, however, be compatible with the proper functioning of the invention. An illustration of parameters $r_0$ and $x_c$ is given in FIGS. 7 and 8.

The value of this relationship may thus diverge from the optimal value of 0.37 and be preferentially between 0.30 and 0.45, or even between 0.12 and 0.62.

In the case, for example, of an energy distribution of the rays of the laser beam 5 considered, during a Gaussian-type emission, the energy profile is found centered on the center of the laser beam emitted. The reshaping performed by the device 1 of the invention allows a reorganization of the energy distribution. The light rays of the beam 5 reoriented by reflection are located on the periphery of the beam emitted. These peripheral rays are then reoriented by the device 1 of the invention toward the center of the Gaussian, allowing reshaping of the beam 5. According to an embodiment feature of the invention that is not limiting, this reshaping of the beam, starting with a Gaussian energy distribution, allows for a homogeneous energy distribution to be obtained, with a signal forming a plateau (top hat). This shaping of the laser beam 5 by rearranging the laser-beam rays ensures the spread of emitted laser-beam energy over the whole of the surface of the beam section. This energy distribution is therefore clearly easier than it is in using mirrors or refractive optics and is less costly than diffractive optics. The latter are, in addition, delicate, high-precision elements which necessitate very meticulous implementation.

In the shaping device 1 of the invention, the rays of laser beam 5 which converge around the entry orifice 2 of device 1 are divergent beyond the focal point. This divergence of a ray of beam 5 to the interior of device 1 can be measured by a beam aperture angle α defined by its extreme rays obtained after focusing. The reflection of these rays by the internal wall of the shaping device 1 requires that the angle α be greater than the maximum angle $α_L$ defined by a trigonometric relation having the geometric dimensions of the waveguide (length L, aperture angle β, entry dimensions Le and exit dimensions Lo) and the position of the focal point of the beam relative to the waveguide entry (Lp) between the mean axis of the shaping device 1 and the axis of the internal wall 4 of the device 1 at which the ray is reflected. The device 1 of the invention, and specifically the angle β of device 1, is thus defined such that the rays reflected at the internal wall 4 of device 1 are oriented toward the exit orifice 3 of device 1 without the possibility of returning to the entry orifice 2 of device 1. The angle β thus depends on the focusing angle α of the incident laser beam, as well as on the position of the focal point upstream of the device entrance.

The reflection of a part of the rays of the laser beam 5 allows a reorientation of these rays along a perceptibly parallel axis or one exhibiting a reduced divergence relative to the axis of shaping 1. This reorientation of the rays, achieved such that these rays are parallel to one another upon exiting 3 the device 1, allows an exiting laser beam 5 to be obtained that takes on the shape of the exit orifice 3 of the device 1 of the invention. In addition, achieving a laser beam 5 exiting 3 from the device which exhibits light rays perceptibly parallel to one another allows a beam 5 to be obtained which includes a considerable depth of field.

The beam divergence is less than 200 mrad, preferentially less than 100 mrad, optimally less than 10 mrad, and ideally 0 mrad.

When implementing the invention by means of the incidence of a laser beam 5 onto the shaping device 1, a compromise should be specified between the beam angle α, the length L of the device, and its aperture angle β. Other parameters also have to be considered, such as the dimensions of the entry $L_e$ and exit $L_0$ apertures, as well as the position of the focal point $L_p$.

As for the convergence of the incident beam, if it is too slight, the peripheral rays will not be reflected, which runs counter to homogenizing the energy distribution of the exiting laser beam 5. In the case of a Gaussian beam, for example, the energy distribution of the laser beam 5 will remain greater at the center, to the detriment of the periphery. Conversely, if the convergence is too great, the peripheral rays will be subjected to numerous reflections, to the detriment of the energy output.

As for the aperture angle β, the phenomenon is comparable. Too large an aperture angle (β) limits the homogeneity of the exiting laser beam 5 and therefore the quality of the shaping.

Also, a specific relationship between the convergence (α) of the incident beam and the aperture angle (β) can be promoted which establishes zones of operation that are governed by the choice of geometric waveguide parameters. In a general way, it is necessary that the convergence angle (α) be greater than the aperture angle (β) in order for the outermost rays of the beam to be able to be reflected at least once.

The relation linking the maximum angle $α_L$, below which there is no homogenization, is of the type:

$$(L - L_p) \cdot tg\left(\frac{α_L}{2}\right) = L \cdot tg\left(\frac{L_s}{2 \cdot L} + \frac{β}{2}\right)$$

Structurally, the device 1 of the invention includes a rigid structure which forms a conduit 6 designed to be crossed by the rays of the shaped laser beam 5. This conduit 6 thus includes an orifice at each of its extremities, one orifice for entry 2, the other for exit 3.

According to a preferred but non-limiting embodiment of the invention, this rigid structure 6 of the device is perceptibly rectilinear along a mean axis. This mean axis can be an axis perpendicular to a cross-section of device 1, centered on the cross-section of device 1, or even passing through an axis or point of symmetry of a cross-section of device 1.

According to a first alternative embodiment, the internal wall 4 of the rigid structure 6 is made reflective with a polished-mirror type of appearance by means of one or a plurality of surface treatments or by machining Too rough a surface state would be the source of energy losses and would reduce the overall output of the device 1.

According to a second alternative embodiment, the internal wall 4 of the rigid structure 6 is made reflective by positioning at least one sheet 4 on the inner surface of the rigid structure. This sheet then forms a coating for the inner surface 4 of the rigid structure 6. This alternative solution allows machining to be avoided on the interior of a closed structure, which is a costly solution.

According to a non-limiting embodiment feature of the invention, the internal wall 4 of the shaping device 1 of the invention can include one or a plurality of facets. This number of facets may depend on the shape of at least one of the orifices of the conduit 6 and in particular on the shape of the exit orifice 3 of the device. This number of facets thus allows a specific geometric shape to be imposed on the laser beam 5 when exiting the device 1. Thus, the device 1 can exhibit a cross-section with a circular, ovoid, or elliptical shape with a facet unique to the whole of the internal wall 4 of the device 1. Similarly, device 1, when it includes a plurality of facets, can exhibit a cross-section with a polygonal shape, for example rectangular or square.

According to a particular embodiment of the device 1 of the invention which is not limiting, this device 1 exhibits an exit orifice 3 formed by means of a section constructed in a plane disposed obliquely relative to the mean axis of the conduit of the device. An embodiment example is represented on FIG. 5.

In addition, the number of facets between the entry orifice 2 and the exit orifice 3 of the shaping device 1 can vary. Similarly, the shape of these walls 4 or reflecting facets can be of different types: planar, concave, convex, or any shapes desired.

According to a non-limiting embodiment feature of the invention, the device 1 includes means of partitioning off the orifices. These means of partitioning thus form apertures positioned at entry 2 and exit 3 of the device to maintain, in the interior of the conduit of device 1, a specific environment or indeed to avoid any pollution of the conduit interior from outside. This specific environment can be created by a liquid or particular gas, or even a particular solid.

In addition, the shaping assembly of the invention can include optics at the exit orifice 3 of the device 1 that ensure that the shaping of the laser beam 5 is completed while resizing the dimensions of this beam 5.

The shaping assembly can also be joined to a device for cooling by means of air or water, this device being associated with the shaping assembly depending on the power of the laser beam processed by the shaping device 1 of the invention.

The shaping assembly can also be joined to a means of generating a film of air at one, at least, of the orifices of the device 1, in particular the exit orifice 3, in order to limit any possible pollution from the constituents of the shaping device 1.

The different elements that make it up or are connected to it, that is, included in the shaping assembly, are held in positions relative to one another thanks to an adaptive support structure.

According to an embodiment feature, the device 1 included in the shaping assembly for light rays is used in a particular system of the invention. This system has at least two shaping assemblies positioned side by side, each processing a light signal shaped respectively by an independent beam. The different assemblies of this system can be disposed, as the case may be, in a column, in a row, on a diagonal, and/or according to any combinations of rows/columns/diagonals. This system thus allows an extended combined beam to be created at which the energy densities can be modulated locally by acting on the power of the respective incident beams.

It is well known that the shaping device of the invention is suited to operating over a wide range of wavelengths, including, in particular, between the ultraviolet and the infrared.

Of course, the invention is not limited to the embodiment described and represented in the drawings attached. Modifications remain possible, in particular from the point of view of the make-up of the various elements or by substituting equivalent techniques, without departing, for all that, from the protected domain of the invention.

The invention claimed is:

1. An optical, geometric, and energetic shaping device for light rays of a laser beam that crosses it, formed by a conduit, comprising:
    an entry orifice;
    an exit orifice; and
    an internal wall, achieved by one or a plurality of facets, the internal wall including opposed internal surfaces that define a non-zero aperture angle ($\beta$) therebetween and extend from the entry orifice to the exit orifice, the internal surfaces adapted to reorient by at least one reflection at least a part of the light rays of the crossing beam.

2. The shaping device for light rays of a laser beam according to claim 1, wherein at least one geometric characteristic of the shaping device is arranged depending on at least one characteristic of the laser beam to reorient the part of the light rays located on a periphery of the laser beam, such that a relationship between this part and a surface of a section of the laser beam defines optical, geometric, and energy properties of the laser beam upon exiting from the shaping device, the geometric characteristics of the shaping device being contained in a list including at least:
    a size (Le) of an aperture of the entry orifice of the shaping device,
    a size (Lo) of an aperture of the exit orifice of the shaping device,
    a shape of the exit orifice of the shaping device,
    a length (L) of the shaping device,
    a position of a focal point (Lp) of the laser beam at the entry orifice of the shaping device,
    a focus angle ($\alpha$) of the laser beam at the entry orifice of the shaping device,
    a shape of the conduit performing as a waveguide.

3. The shaping device for light rays of a laser beam according to claim 1, wherein the shaping device is arranged to allow only one single and unique reflection to the part of the light rays of the crossing beam reflected by the shaping device.

4. The shaping device for light rays of a laser beam according to claim 1, wherein the shaping device is arranged to reorient the part of the light rays located on a periphery of the laser beam in such a way that a relationship between the reoriented or reflected part and the part of the laser beam not reflected corresponds to a value between 0.12 and 0.62, in order to obtain a laser beam upon exit from the shaping device including a homogeneous distribution of its light rays and an optimal energy output relative to the laser beam at the entry orifice to the shaping device, as well as a beam divergence less than 200 mrad.

5. The shaping device for light rays of a laser beam according to claim 4, wherein the relationship between the reoriented or reflected part and the surface of a section of the laser beam has a value equal to 0.37.

6. The shaping device for light rays of a laser beam according to claim 1, wherein the shaping device includes a rigid carrier structure which forms a conduit designed to be crossed by the light rays of the beam and at least one internal wall achieved by a surface covered with a reflective coating.

7. The shaping device for light rays of a laser beam according to claim 1, wherein the shaping device is configured and dimensioned to partition off orifices forming apertures at the entry orifice to and exit orifice from the shaping device, in order to maintain a specific environment in an interior of the shaping device or to avoid any pollution of an interior of the conduit from outside.

8. The shaping device for light rays of a laser beam according to claim 1, wherein the shaping device exhibits a circular or elliptical cross-section.

9. The shaping device for light rays of a laser beam according to claim 1, wherein the shaping device exhibits a polygonal cross-section.

10. The shaping device for light rays of a laser beam claim 1, wherein the shaping device exhibits an exit orifice formed by a section constructed on a plane disposed obliquely relative to a mean axis of the conduit.

11. A shaping assembly for light rays of a laser beam, comprising:
    a shaping device for light rays according to claim 1; and
    an optics system to concentrate the light rays of the laser beam in a direction of the entry orifice of the shaping device.

12. A system, comprising:
    at least two shaping assemblies for light rays positioned side by side, each shaping assembly including a shaping device for light rays according to claim 1, the at least two shaping assemblies performing shapings of their respective light beams in an independent manner relative to one another.

13. The shaping device for light rays of a laser beam according to claim 9, wherein the shaping device exhibits a rectangular or square cross section.

* * * * *